3,839,541
SILICON NITRIDE PRODUCTS
Roland John Lumby, Northfield, Birmingham, Paul Grieveson, Whitley Bay, Northumberland, and Roger Francis Stokes, Hall Green, Birmingham, England, assignors to Joseph Lucas (Industries) Limited, Birmingham, England
No Drawing. Filed Sept. 23, 1971, Ser. No. 183,259
Claims priority, application Great Britain, Sept. 26, 1970, 45,960/70, 45,961/70
Int. Cl. C01b 21/06
U.S. Cl. 423—344       8 Claims

ABSTRACT OF THE DISCLOSURE

In the manufacture of silicon nitride products, a silicon powder is used which is arranged to contain between 1.4% and 2.5% by weight of reactable oxygen in the form of a oxygen-containing compound which is in the solid phase at the elevated temperature used to nitride the silicon.

---

This invention relates to silicon nitride products.

Conventionally, silicon nitride products are manufactured by one of two well-known methods, that is either by pressing silicon nitride powder at an elevated temperature to form a so-called hot pressed product, or by sintering a silicon powder compact in an atmosphere of nitrogen to form a so-called reaction bonded product. In manufacturing a hot pressed product it is normally desirable, if a strong product is to be obtained, to ensure that the powder to be hot pressed contains all α-phase silicon nitride and none of the β-phase material, or at least to ensure that the amount of the β-phase material is reduced to a very low level. Similarly, it may be desirable, in the production of a reaction bonded product, to ensure that the nitriding of the silicon powder compact produces substantially all α-phase silicon nitride. In the past, however, considerable difficulty has been experienced in producing predominantly α-phase silicon nitride by the nitriding of silicon, both in the form of a powder and in the form of a compact, since a skin of β-phase silicon nitride tends to form over the silicon particles which slows down the reaction and eventually leads to a high β-phase concentration in the silicon nitride produced.

It has now been found that the production of silicon nitride having a high α-phase content can be facilitated if the charge to be nitrided is arranged to contain, as well as silicon powder, an oxygen-containing compound which is in the solid phase at the nitriding temperature and will provide oxygen at the reaction interface between the silicon and nitrogen, such oxygen being herein defined as reactable oxygen, provided that the total reactable oxygen in the system is arranged to be between 1.4% and 2.5% by weight of the silicon powder. The explanation for this improvement is believed to be that the formation of α-phase silicon nitride involves a reversible vapour phase reaction including oxygen in which the volatile silicon/oxygen compound silicon monoxide is formed as a transient intermediate. The provision of the solid phase, oxygen containing compound in the charge then promotes formation of the silicon monoxide and thereby formation of the α-phase product. Of course, the amount of the oxygen containing compound in the charge must be sufficient to drive the equilibrium of the reaction towards silicon nitride whereas excess of the oxygen containing compound must be avoided since it is found that this delays the onset of the nitriding reaction and also produces impurities of silicon oxynitride and/or silica in the resultant silicon nitride product. Thus the amount of the oxygen containing compound in the silicon to be nitrided must be controlled so that the total reactable oxygen present is between 1.4% and 2.5% by weight of the silicon. Further, it is thought that the reactable oxygen must be supplied to the system in the form of a solid phase, oxygen-containing compound because if excess oxygen were included in the nitriding gas it would tend to produce a skin of silicon oxynitride and/or silica over the silicon particles which would then inhibit the nitriding reaction. It is, however, to be appreciated conventional nitriding gases, such as forming gas, contain some oxygen but in amounts sufficiently small to be negligible.

It has also been found that most commercially available silicon powders contain some reactable oxygen as a film of silica over the silicon particles. Thus, in carrying out the invention with such powders, it is of course necessary to adjust the amount of reactable oxygen contained by the powder prior to nitriding. In fact, the amount of silica contained by any given-batch of commercial silicon powder will generally be unknown so that initially it will normally be necessary to measure the amount of silica present so that the amount of reactable oxygen can be adjusted to the required value.

In one aspect, the invention resides in a silicon powder for use in the manufacture of silicon nitride, wherein the powder is arranged to contain between 1.4% and 2.5% by weight of reactable oxygen.

In a further aspect, the invention resides in a method of manufacturing silicon nitride powder predominantly in the α-phase by subjecting silicon powder to a nitriding atmosphere at an elevated temperature below the melting point of the silicon powder, characterised by including the step of ensuring that, prior to nitriding, the silicon powder includes a compound, which is in the solid phase at said elevated temperature and which contains reactable oxygen, in an amount such that there is present in the silicon powder between 1.4% and 2.5% by weight of reactable oxygen.

In yet a further aspect the invention resides in a method of manufacturing a silicon nitride product by forming silicon powder into a compact and then subjecting the silicon compact to a nitriding atmosphere at an elevated temperature below the melting point of the silicon compact, characterised by including the step of ensuring that, prior to formation of the silicon compact, the silicon powder includes a compound, which is in the solid phase at said elevated temperature and which contains reactable oxygen, in an amount such that there is present in the silicon powder between 1.4% and 2.5% by weight of reactable oxygen.

Conveniently, the method includes the further steps of measuring the amount of reactable oxygen in the silicon powder, and adjusting the amount of reactable oxygen so that the powder contains between 1.4% and 2.5% by weight of reactable oxygen.

Preferably, the amount of reactable oxygen in the silicon powder is arranged to between 1.5% and 1.75% by weight of the silicon powder.

Conveniently, the silicon powder, prior to nitriding, is mixed with up to 50% by weight of α-phase silicon nitride.

Preferably, the silicon powder, prior to nitriding, is mixed with up to 5% by weight of α-phase silicon nitride.

In one example of the invention, it was required to manufacture silicon nitride powder predominantly in the α-phase by nitriding silicon powder having a mean particle size in the region of 10 microns, the silicon powder being that supplied by Murex Limited under the trade name "Superfine." Initially, the amount of reactable oxygen contained by the silicon powder was measured by neutron activation analysis and it was found that approximately 1.2% of the powder consisted of rectable oxygen, in the form of a silica film over the silicon particles.

Then 300 gms. of the silicon powder were mixed with 5% by weight of a high α-phase silicon nitride powder and 0.5% by weight of fine, precipitated silica, it being appreciated that this amount of silica was sufficient to adjust the reactable oxygen content of the powder to 1.5% by weight of the silicon. The powder mixture was then introduced into a reaction bed of a silicon nitride furnace and a thermo-couple was positioned within the bed. A further thermo-couple was also contained within the furnace just outside the reaction bed, the thermo-couples being connected to a control circuit for controlling conditions within the furnace. The furnace heater was then turned on and the temperature within the furnace was raised, while at the same time forming gas which consisted of 90% nitrogen and 10% hydrogen was introduced into the furnace under the control of a valve. During raising of the temperature, the thermo-couple outside the reaction bed, which was arranged to be closer to the furnace heater, was at a higher temperature than the thermo-couple within the bed, and, while this relationship was maintained, the control circuit was arranged to have no effect on the conditions within the furnace. However, because the reaction between silicon and nitrogen to produce silicon nitride is exothermic, as soon as nitriding began, it was found that the temperature in the reaction bed increased above the temperature of the thermo-couple outside the reaction bed. When exotherming occurred, the control circuit was arranged to alter the conditions inside the furnace so as to slow down the nitriding reaction and thereby halt the increase in temperature of the reaction bed, it being appreciated that if the temperature of the bed became too high β-phase silicon nitride would have been formed. Conveniently, the control circuit altered the conditions within the furnace by diluting the nitrogen in the furnace atmosphere by decreasing the amount of forming gas allowed through its respective valve and introducing a gas inert to the nitriding reaction, such as argon, through a further valve. Control could also have been effected by evacuating the interior of the furnace through a vacuum pump and, in addition, the furnace heater could have been turned off to remove the supply of heat to the furnace. By using this control, the temperature of the furnace was maintained at 1230° C. for five hours, then allowed to rise to 1355° C. and maintained at this temperature for a further 4 hours. It is to be appreciated that throughout the nitriding reaction the temperature in the furnace was maintained below the melting point of silicon, which is in the region of 1415° C. After completion of the nitriding reaction, the furnace bed was allowed to cool and, on analysis, the silicon nitride produced was found to contain 91.5% of the α-phase material, without any impurities of silica or silicon oxynitride.

To test the effectiveness of producing predominantly α-phase silicon nitride powder by the method of the invention, two silicon powder test samples were produced. Each sample contained 300 gms. of the silicon powder used in the above example together with 5% by weight of a high α-phase silicon nitride powder, but in the first sample no silica was added and in the second sample 4% silica by weight of the silica was added. It is to be understood that the addition of 4% by weight of silica was equivalent to the addition of about 2% by weight of reactable oxygen so that this addition took the total amount of reactable oxygen in the silicon powder to 3.2%, that is above the range according to the invention. The two test samples were then nitrided in exactly the same manner as in the previous example, although in the case of the second sample, which contained excess reactable oxygen, the onset of the nitriding reaction, as indicated by a sudden rise in temperature in the thermo-couple in the reaction bed, was found to be delayed by two hours as compared with the nitriding of the composition of the first example. After nitriding, the first sample was found to contain only 86% of the required α-phase silicon nitride, and, although the second sample contained 91% α-phase silicon nitride, a substantial amount of silicon oxynitride was also present.

In a second example of the invention, it was required to manufacture a predominantly α-phase silicon nitride powder from a coarse silicon powder as sold by Koch-Light Laboratories Limited with a particle size of 45 microns. Measurement of the oxygen content of the powder by neutron activation analysis showed that the powder contained 0.5% by weight of oxygen, and, so as to bring the oxygen content of the powder to the required level, 1.9% by weight of silica was mixed with the powder. In addition, 5% by weight of α-phase silicon nitride was added to the mixture, whereafter the mixture was nitrided in the same manner as in the previous examples. The resultant silicon nitride powder was found to contain 91% of the α-phase material without any silicon oxynitride being present. By comparison, a mixture of the same coarse silicon powder together with 5% by weight of α-phase silicon nitride, but without any silica addition, was nitrided in the same manner as before. Now, the resultant silicon powder was only found to contain 70% of the α-phase material.

In a modification of the second example of the invention, the coarse silicon powder was ground in an oxidising atmosphere so that during the grinding operation, the coarse silicon particles were not only broken up, but were also oxidised. Using this particular powder, it was found that the reactable oxygen content of the powder reached the required value of 1.6% by weight of the silicon when the powder had a mean particle size of 6.2 microns. The ground powder was then mixed with 25% by weight of α-phase silicon nitride and was nitrided as before to give a 92.5% α-phase silicon nitride powder.

In a third example of the invention, α-phase silicon nitride powder was manufactured from a silicon powder supplied by Dunstan and Wragg Limited with a mean particle size of 3 microns. In this case, neutron activation analysis measurements, showed that the silicon powder contained nearly 3% by weight of oxygen in the form of silica. Thus, it was necessary to reduce the oxygen content of the powder prior to nitriding and, in one particular example, this was effected by initially treating the powder with borofluoric acid which removed the silica, but did not attack the silicon. After washing in water to remove excess acid, controlled oxidation of the silicon powder was carried out so as to arrive at a reactable oxygen content of 1.6% by weight of the silicon powder. The silicon powder produced after nitriding was then found to have an α-phase content of 92% without any silica or silicon oxynitride impurities. However, by comparison, direct nitriding of the silicon powder used in this example, without initial reduction of the oxygen content, was found to produce a silicon nitride powder which, although having an α-phase content of 92%, contained considerable silica and silicon oxynitride impurities.

In a fourth example, silicon nitride powder was prepared from a mixture of the Murex "Superfine" silicon powder of the first example and 0.5% silica. The powder produced contained 91.5% of the α-phase material, but the time taken for the nitriding reaction to reach completion was found to be considerably longer than in the first example, in which α-phase silicon nitride was added to the silicon powder prior to nitriding.

In a fifth example, Murex "Superfine" silicon powder was mixed with 5% by weight of α-phase silicon nitride, and 0.5% by weight of silica, as in the first example, but the powder mixture was then pressed into a compact. The compact was then nitrided in a similar manner to the previous examples and the reaction bonded, silicon nitride product produced contained 80% of α-phase silicon nitride. This result compared favourably with a reaction bonded product obtained using a similar mixture, but without the addition of any silica, which was found to have a α-phase content of 75%.

It is to be appreciated that other solid phase compounds containing reactable oxygen could have been used to replace the silica in the preceding examples, provided the amounts of these other compounds were chosen so as to provide the required reactable oxygen content in the powder to be nitrided. Examples of other such suitable compounds are silicon oxynitride, and silicon monoxide.

We claim:

1. A method of manufacturing silicon nitride powder predominantly in the α-phase by reacting silicon powder with a nitriding atmosphere at an elevated temperature below the melting point of the silicon powder, which comprises providing that, prior to nitriding, the silicon powder includes a compound which is in the solid phase at said elevated temperature and which contains oxygen which will take part in the nitriding reaction, the amount of said compound being such that there is present in the silicon powder between 1.4% and 2.5% by weight of reactable oxygen.

2. A method as claimed in claim 1 wherein the silicon powder, prior to nitriding, is mixed with up to 50% by weight of α-phase silicon nitride.

3. A method as claimed in claim 1 wherein the silicon powder, prior to nitriding, is mixed with up to 5% by weight of α-phase silicon nitride.

4. A method as claimed in claim 1 wherein the amount of reactable oxygen in the silicon powder is arranged to be between 1.5% and 1.75% by weight of the silicon powder.

5. A method of manufacturing a silicon nitride product by forming silicon powder into a compact and then reacting the silicon compact with a nitriding atmosphere at an elevated temperature below the melting point of the silicon compact, which comprises providing that, prior to formation of the silicon compact, the silicon powder includes a compound which is in the solid phase at said elevated temperature and which contains oxygen which will take part in the nitriding reaction, the amount of said compound being such that there is present in the silicon powder between 1.4% and 2.5% by weight of reactable oxygen.

6. A method as claimed in claim 5 wherein the silicon powder, prior to nitriding, is mixed with up to 50% by weight of α-phase silicon nitride.

7. A method as claimed in claim 5 wherein the silicon powder, prior to nitriding, is mixed with up to 5% by weight of α-phase silicon nitride.

8. A method as claimed in claim 5 wherein the amount of reactable oxygen in the silicon powder is arranged to between 1.5% and 1.75% by weight of the silicon powder.

References Cited
UNITED STATES PATENTS

| | | | |
|---|---|---|---|
| 2,618,565 | 11/1952 | Nicholson | 106—44 |
| 3,244,480 | 4/1966 | Johnson et al. | 423—344 |
| 3,591,337 | 7/1971 | Lumbey | 423—344 |

BRIAN E. HEARN, Assistant Examiner